US011078950B2

(12) United States Patent
Wymore et al.

(10) Patent No.: US 11,078,950 B2
(45) Date of Patent: Aug. 3, 2021

(54) FASTENER BIASING SYSTEM

(71) Applicant: Raytheon Company, Waltham, MA (US)

(72) Inventors: Jacob L. Wymore, Huntsville, AL (US); Ross Warlick, Huntsville, AL (US); Eric Klasen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 357 days.

(21) Appl. No.: 15/905,745

(22) Filed: Feb. 26, 2018

(65) Prior Publication Data

US 2019/0264727 A1    Aug. 29, 2019

(51) Int. Cl.
| F16B 43/02 | (2006.01) |
| F16B 39/10 | (2006.01) |
| F16B 31/04 | (2006.01) |
| F16B 5/02 | (2006.01) |

(52) U.S. Cl.
CPC ............ *F16B 39/10* (2013.01); *F16B 5/0266* (2013.01); *F16B 31/04* (2013.01)

(58) Field of Classification Search
CPC .................................................. F16B 5/0266
USPC ............... 411/347; 267/140.13, 140.2, 140.3
See application file for complete search history.

(56) References Cited

U.S. PATENT DOCUMENTS

| 2,457,384 A | * | 12/1948 | Krenz | ................. | F16L 27/047 285/261 |
| 3,083,042 A | * | 3/1963 | Collar | .................. | F16L 37/101 285/93 |
| 3,461,769 A | * | 8/1969 | Brosseit | ................ | F16B 5/0266 411/385 |
| 4,387,497 A | * | 6/1983 | Gulistan | ................ | B23P 11/00 29/511 |
| 4,859,148 A | * | 8/1989 | Hibyan | .................. | B64C 27/35 416/134 A |
| 4,915,557 A | * | 4/1990 | Stafford | ................ | F16B 5/0208 292/251 |
| 5,238,343 A | * | 8/1993 | Scherrer | ............... | F16B 7/0446 403/297 |

(Continued)

FOREIGN PATENT DOCUMENTS

| DE | 3018014 A1 | 11/1981 |
| GB | 2175061 A | 11/1986 |

(Continued)

OTHER PUBLICATIONS

International Search Report for International Application No. PCT/US2018/067560 dated Mar. 25, 2019, 22 pages.

UNICORP, Spring-Loaded Non-Flush Captive Panel Screw Tool Installation Only PFC2P-U, PFC2PLS-U, PFC2PL-U, https://www.unicorpinc.com/PFC2P_PFC2PLS_PFC2PL_Spring_loaded_non_flush_captive_panel_screw.htm, retrieved on Feb. 27, 2018, 7 pages, UNICORP, Orange, New Jersey.

(Continued)

*Primary Examiner* — Gary W Estremsky (57) ABSTRACT

A biasing system for use with a fastener is disclosed. The biasing system can include a sleeve configured to be disposed about a shank of a fastener and operable to form at least a portion of a first load path between the fastener and a component coupled to the fastener to preload the fastener through the sleeve. The biasing system can also include a spring configured to be associated with the sleeve and operable to form at least a portion of a second load path parallel to the first load path between the fastener and the component to facilitate biasing the fastener away from the component.

20 Claims, 4 Drawing Sheets

(56) References Cited

U.S. PATENT DOCUMENTS

| | | | | |
|---|---|---|---|---|
| 5,336,028 A | * | 8/1994 | Yamamoto | F16B 5/0208 403/21 |
| 5,624,130 A | * | 4/1997 | Ricks | B60R 21/2035 24/453 |
| 5,839,321 A | * | 11/1998 | Siemons | F16H 25/2006 74/441 |
| 5,935,170 A | * | 8/1999 | Håkansson | H04R 25/606 24/DIG. 53 |
| 6,074,146 A | * | 6/2000 | Soemer | F16B 5/0208 411/107 |
| 6,468,012 B2 | * | 10/2002 | Ellis | F16B 41/002 411/107 |
| 6,622,987 B2 | * | 9/2003 | Sterud | F16K 41/02 251/214 |
| 7,096,768 B1 | * | 8/2006 | Chen | B25B 15/001 81/125 |
| 7,474,530 B2 | * | 1/2009 | Stewart | H01L 23/4006 165/104.33 |
| 8,523,154 B2 | * | 9/2013 | Fujiwara | F16F 3/0873 267/293 |
| 8,950,991 B2 | * | 2/2015 | Trifilio | B25B 23/00 411/103 |
| 9,168,646 B2 | | 10/2015 | Galota et al. | |
| 2009/0191976 A1 | * | 7/2009 | Wang | F16B 5/0208 470/2 |
| 2009/0313804 A1 | * | 12/2009 | Wang | F16B 5/0208 29/525.11 |
| 2012/0263555 A1 | * | 10/2012 | Wang | F16B 5/0266 411/337 |
| 2016/0299015 A1 | | 10/2016 | Schmier, II et al. | |

FOREIGN PATENT DOCUMENTS

| | | |
|---|---|---|
| GB | 2222649 A | 3/1990 |
| WO | WO 2012/051461 A2 | 4/2012 |

OTHER PUBLICATIONS

UNICORP, Spring-Loaded Non-Flush Captive Panel Screw With Anti-Cross Thread—Tool Installation Only PFC4M-U, PFC4LSM-U, PFC4LM-U, https://www.unicorpinc.com/PFC4M_PFC4LSM_PFC4LM_spring_loaded_non_flush_captive_panel_screw_with_anti-cross-thread.htm, retrieved on Feb. 27, 2018, 5 pages, UNICORP, Orange, New Jersey.

UNICORP, Spring-Loaded Spinning Clinch Bolt Captive Panel Screw—Tool Installation Only SCBR-U, https://www.unicorpinc.com/SCBR-spring_loaded_spinning_clinch_bolt.htm, retrieved Feb. 27, 2018, 2 pages, UNICORP, Orange, New Jersey.

* cited by examiner

FASTENER BIASING SYSTEM

GOVERNMENT LICENSE RIGHTS

This invention was made with government support under HQ0276-10-C-0005 awarded by the Department of Defense. The government has certain rights in the invention.

BACKGROUND

Some structural joints formed with fasteners, such as in tooling and handling fixtures, may be repeatedly assembled and disassembled during normal use. In some cases, fasteners may need to be kept disengaged from the receiving threads to facilitate disassembly. In other cases, fasteners may be subjected to loading that inhibits removal. Therefore, joints may include springs under the fastener heads to assist with removal and disassembly, which can bias fasteners out of engagement with receiving threads and maintain fasteners out of engagement with receiving threads.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although springs located under fastener heads can effectively assist in joint disassembly, this approach has significant drawbacks for structural joints. Structural joints require a certain amount of preload, which cannot be reliably achieved and maintained with a spring in the load path. Simply using a spring under a fastener head therefore compromises the integrity of structural joints. Thus, a solution is needed for structural joints that not only aids in joint disassembly but also provides the ability to reliably preload the joints.

Accordingly, a biasing system for use with a fastener is disclosed that provides for ease of joint disassembly and maintains joint preload capabilities. The biasing system can include a sleeve configured to be disposed about a shank of a fastener and operable to form at least a portion of a first load path between the fastener and a component coupled to the fastener to preload the fastener through the sleeve. The biasing system can also include a spring configured to be associated with the sleeve and operable to form at least a portion of a second load path parallel to the first load path between the fastener and the component to facilitate biasing the fastener away from the component.

A fastener system is also disclosed that can include a component, a fastener coupled to the component, and a biasing system. The biasing system can have a sleeve disposed about a shank of the fastener and operable to form at least a portion of a first load path between the fastener and the component to preload the fastener through the sleeve. The biasing system can also have a spring associated with the sleeve and operable to form at least a portion of a second load path parallel to the first load path between the fastener and the component to facilitate biasing the fastener away from the component.

Figure 1A:
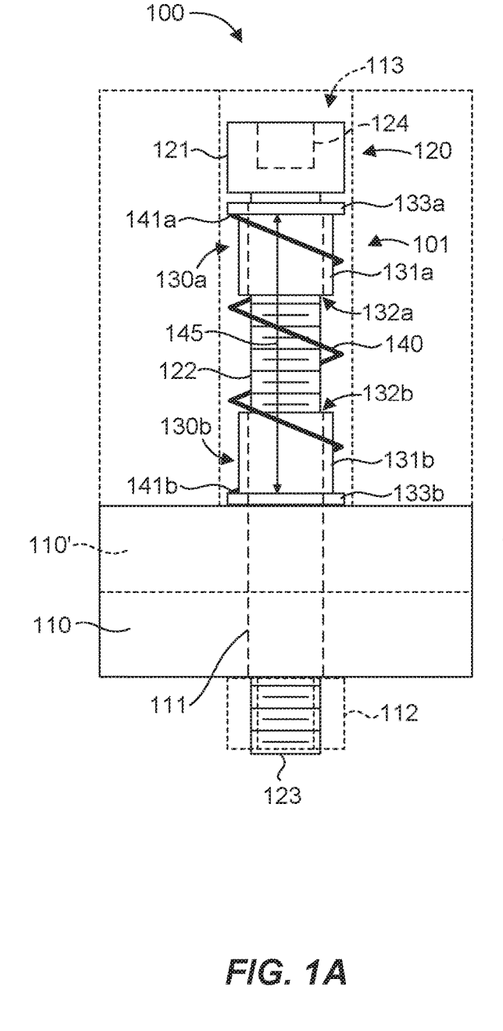
FIG. 1A is an illustration of a fastener system with a biasing system in a disengaged configuration, in accordance with an example of the present disclosure.
Figure 1B:
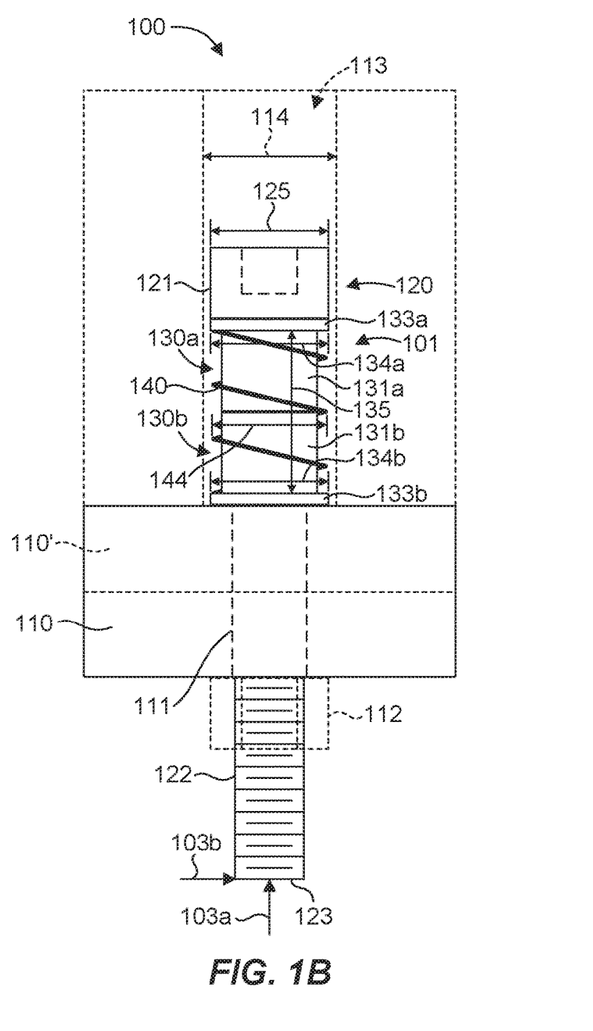
FIG. 1B is an illustration of the fastener system of FIG. 1A with the biasing system in a preload configuration, in accordance with an example of the present disclosure.
Figure 2A:
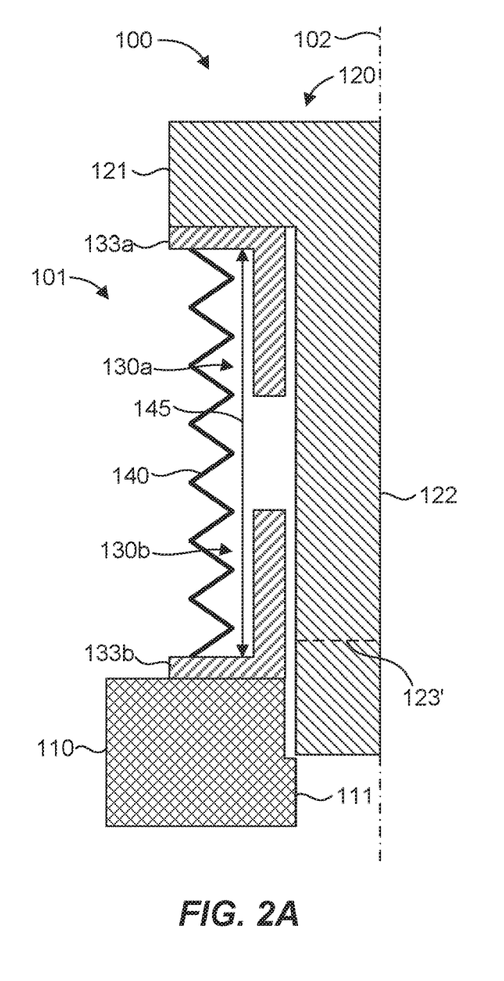
FIG. 2A is a schematic cross-sectional representation of the fastener system of FIG. 1A with the biasing system in a disengaged configuration, in accordance with an example of the present disclosure.
Figure 2B:
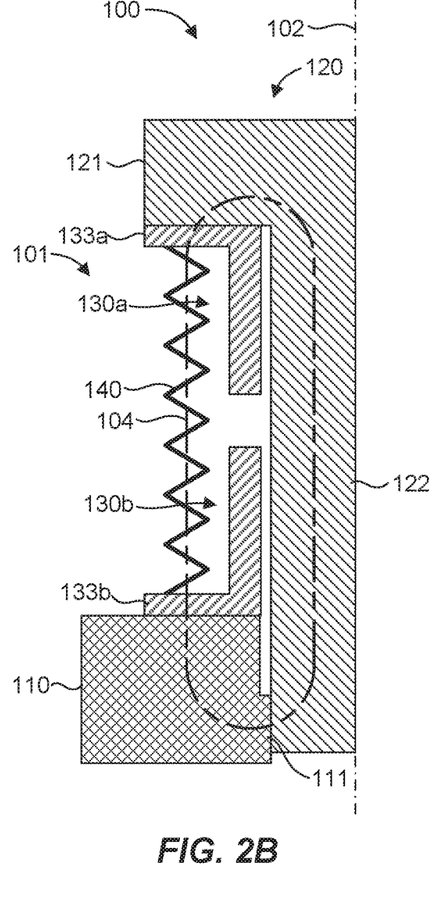
FIG. 2B is a schematic cross-sectional representation of the fastener system of FIG. 1A with the biasing system in an engaged configuration, in accordance with an example of the present disclosure.
Figure 2C:
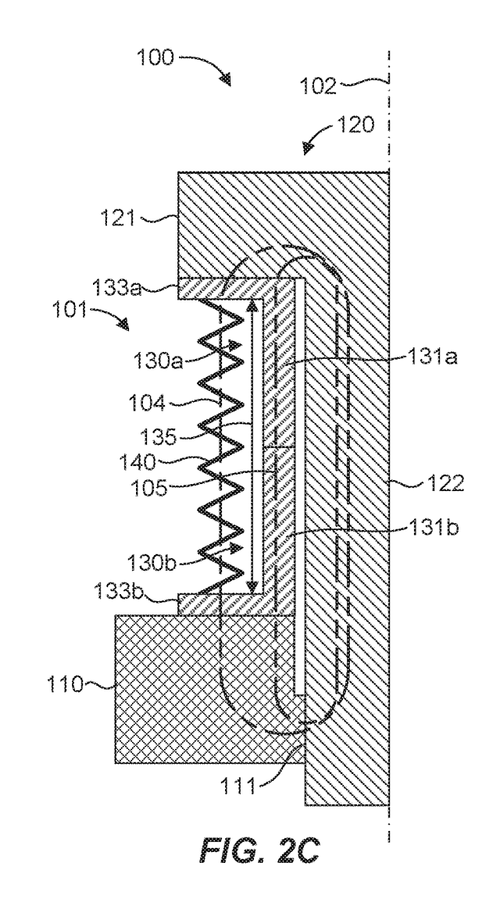
FIG. 2C is a schematic cross-sectional representation of the fastener system of FIG. 1A in preload configuration, in accordance with an example of the present disclosure.

To further describe the present technology, examples are now provided with reference to the figures. With reference to FIGS. 1A and 1B, one embodiment of a fastener system 100 is illustrated. The fastener system 100 can comprise a component 110, a fastener 120 coupleable to the component 110, and a biasing system 101 for use with the fastener 120 to bias the fastener 120 away from the component 110. The component 110 can comprise any type of object, device, or structure operable or configured and intended to be used with one or more fasteners. FIGS. 2A-2C illustrate schematic representations of the fastener system 100 shown in half cross-section symmetry about an axis 102.

The fastener 120 can be or include any suitable type of threaded fastener, such as a bolt, screw, nut, etc. In the illustrated embodiment, the fastener 120 comprises a bolt or a screw having a head 121 and a shank 122, which extends from the head 121 to a tip 123 or end of the fastener 120. The shank 122 can be partially or fully threaded. In some embodiments, the fastener 120 can comprise a threaded rod and one or more nuts operable with the threaded rod to couple the fastener to the component 110. The fastener 120 can be coupled to the component 110 via threads formed in the component 110, such as at 111. Alternatively, the fastener 120 can be coupled to the component 110 via a nut 112 (FIGS. 1A and 1B). In some embodiments, the tip 123 of the fastener 120 can engage directly or indirectly with an object (not shown) to be secured or clamped by the fastener 120, which can exert forces 103*a*, 103*b* (FIG. 1B) on the fastener 120 that can hinder removal of the fastener 120. In some embodiments, the fastener 120 can be utilized to couple multiple components 110, 110' to one another.

In some embodiments, the component 110 or 110' can include an opening 113, such as a counterbore, configured to receive at least a portion of the head 121 (or, alternatively, a nut) of the fastener 120. In one aspect, the opening 113 can have an inner diameter 114 sized to receive the head 121 (or, alternatively, a nut) of the fastener 120 and facilitate application of torque to the fastener 120 by a suitable tool. The fastener 120 can have any suitable tool interface 124 or configuration (e.g., parallel flat surfaces) for interfacing with a tool for the application of torque to the fastener 120. In the illustrated embodiment, the tool interface 124 comprises an internal recess formed in the head 121 for receiving and engaging a tool. In this case, the head 121 can have an external configuration that is cylindrical. In some embodiments, the tool interface 124 can include an external interface. Thus, the fastener 120 can be configured as a cap screw, a hex head, a socket head, or any other suitable type of fastener.

As described in more detail below, the biasing system 101 can be utilized with any fastener 120 and component(s), such as components 110, 110', to assist with removal of the fastener 120 and/or to maintain the fastener 120 disengaged from the threads when not coupled to the components 110, 110'.

Typical uses for the biasing system 101 therefore may include applications where the fastener 120 is to be removed after assembly with the components 110, 110' (e.g., as part of the normal use of the fastener 120), such as a tooling fixture, a lift beam, a handling ring, a clamp, etc. In one example, the biasing system 101 can be used in a hardware/flight application where separation of a structural joint needs to occur (e.g., missile staging). In other examples, the biasing system 101 can be used in applications where gravity cannot be used to assist with fastener removal, such as hardware (e.g., large or delicate items) that cannot be rotated to the point where the fastener would fall out (i.e., turned upside down). In a further example, the biasing system 101 can be used where multiple captive fasteners must be simultaneously held disengaged from threaded interfaces, but due to fastener orientation, gravity tends to pull at least one of the fasteners back into engagement with a threaded interface. Although applications having fasteners with a high engage/disengage frequency may benefit the most, it should be recognized that even applications where a fastener is intended to be installed once and left in for the life of the hardware could benefit from the biasing system 101 in the event the applicable hardware had to be disassembled.

The biasing system 101 can include one or more sleeves 130*a*, 130*b* configured to be disposed about the shank 122 of the fastener 120. For example, the sleeves 130*a*, 130*b* can have respective body portions 131*a*, 131*b* that include openings 132*a*, 132*b* configured to receive the fastener 120 (e.g., the shank 122). In one aspect, the body portions 131*a*, 131*b* can be configured as hollow cylinders. The sleeves 130*a*, 130*b* can be configured to interface with the fastener (e.g., the head 121), and/or the component 110. The sleeves 130*a*, 130*b* can be constructed of any suitable material, such as iron-based alloys (e.g., steel), nickel-based alloys, cobalt-based alloys, titanium-based alloys, aluminum-based alloys, composites (e.g., metal matrix composites, carbon composites), and others as recognized by those skilled in the art.

In the illustrated embodiment, the sleeves 130*a*, 130*b* include flanges 133*a*, 133*b* that extend outwardly at the ends of the respective sleeves 130*a*, 130*b* that are configured to interface with the fastener 120 and/or the component 110. A flanged collar can have a "T" shape or configuration. In one aspect, a diameter 134*a* of the flange 133*a* and/or a diameter 134*b* of the flange 133*b* can be less than or equal to an outer dimension 125 (e.g., diameter or width) of the head 121 (or, alternatively, a nut) of the fastener 120. This can ensure that the sleeves 130*a*, 130*b* can fit within the opening 113 of the component 110 or 110'. In one aspect, sizing the diameter 134*b* the flange 130*b* to be the same size as the outer diameter 125 of the fastener 120 can provide substantially the same contact area with the component 110 as the head 121 (or, alternatively, a nut) of the fastener 120, which can maintain the effective diameter and load transfer capabilities of the fastener even with the presence of the biasing system 101. It should be recognized that the diameters 134*a*, 134*b* of the flanges 133*a*, 133*b* can be the same or different. The sleeves 130*a*, 130*b* can also be configured to interface with one another, such as at ends opposite the flanges 133*a*, 133*b*. In some embodiments, the sleeve 130*a* can be integrally formed with the fastener 120 in a single, monolithic structure (e.g., by initial construction or by permanent attachment, such as a weld, adhesive, etc.). Similarly, in some embodiments, the sleeve 130*b* can be integrally formed with the component 110 in a single, monolithic structure.

The biasing system 101 can also include a spring 140 configured to be associated and operable with the sleeves 130*a*, 130*b*. In the illustrated embodiment, the spring 140 is disposed on outer sides of the sleeves 130*a*, 130*b*. The spring 140 can be any suitable type of spring having any suitable configuration, such as a compression spring having a helical configuration. The spring 140 can have any suitable characteristic, such as a suitable spring rate (e.g., a linear spring rate, a progressive spring rate, and/or a digressive spring rate). Although only a single spring is illustrated, it should be recognized that multiple springs can be utilized in series (e.g., a stacked configuration), which may facilitate providing a desired spring characteristic (e.g., spring rate). The spring 140 can be constructed of any suitable material, such as iron-based alloys (e.g., steel), nickel-based alloys, cobalt-based alloys, titanium-based alloys, aluminum-based alloys, composites (e.g., metal matrix composites, carbon composites), and any others as recognized by those skilled in the art.

In one aspect, the flanges 133*a*, 133*b* and the spring 140 can be configured to interface with one another. Thus, the flanges 133*a*, 133*b* can serve as spring seats to bear against opposite ends 141*a*, 141*b* of the spring 140. In one aspect, a diameter 144 (e.g., a compressed diameter as in FIG. 1B) of the spring 140 can be less than or equal to the outer dimension 125 (e.g., diameter or width) of the head 121 (or, alternatively, a nut) of the fastener 120. This can ensure that the spring 140 can fit within the opening 113 of the component 110 or 110' during use. In some embodiments, the spring 140 can be attached (e.g., fixed in at least one degree of freedom) to the sleeve 130a and/or the sleeve 130b.

In one aspect, the spring 140 can provide a separation or biasing force to the fastener 120 and the component 110. In the illustrated embodiment, the separation or biasing force can be applied to the flanges 133a, 133b of the sleeves 130a, 130b, which in turn can push against the head 121 of the fastener 120 and the component 110, respectively. As shown in FIGS. 1A and 2A, a free, unloaded length 145 of the spring 140 can be greater than a compressed spring length 135 defined by the sleeves 130a, 130b. As discussed in more detail below, this can ensure that a load path 104 is formed at the fastener position shown in FIG. 2B (e.g., upon compression of the spring 140 between the fastener 120 and the component 110), and that a load path 105 is formed at the fastener position shown in FIG. 2C (e.g., upon contact between the fastener 120, the sleeves 130a, 130b, and the component 110).

In one aspect, the spring 140 and the fastener 120 can be configured such that when the spring 140 is substantially uncompressed at the unloaded, free length 145, the fastener 120 threads can be engaged with, or disengaged from, threads operable to couple the fastener 120 to the component 110. For example, as shown in FIG. 1A, the spring 140 and the fastener 120 can be configured such that the fastener 120 threads are engaged with the threads 111 of the component 110 while the spring 140 is substantially uncompressed at the unloaded, free length 145. In this case, the fastener 120 can be threaded into or out of engagement with the threads 111 of the component 110 without acting on the spring 140. In other words, the fastener 120 can engage the threads 111 before the spring 140 compresses, or the fastener can disengage the threads 111 after the spring 140 has become uncompressed and reached its unloaded, free length 145. On the other hand, as shown in FIG. 2A, the spring 140 and the fastener 120 can be configured such that threads of the fastener 120 are disengaged from the threads 111 of the component 110 short of the spring 140 reaching its unloaded, free length 145. In this case, when the spring 140 is extended to its unloaded, free length 145, the spring 140 can push the fastener 120 away, or maintain the fastener 120 separated from, the threads 111 of the component 110. In other words, with the fastener 120 disengaged from the threads 111 that couple the fastener 120 to the component 110, spring force provided by the spring 140 can push or maintain the sleeves 130a, 130b apart from one another. In one embodiment, the biasing system 101 and the fastener 120 can be configured such that a tip 123' or end of the fastener 120 is retracted from, or does not extend beyond, the sleeve 130b (e.g., the flange 133b) when the spring 140 is extended to its unloaded, free length 145. In this case, the tip 123' of the fastener 120 can be prevented from protruding and snagging on items (e.g., the component 110) as well as prevent unintended thread engagement, thus facilitating handling and placement of the fastener 120 and/or the component 110.

During installation, the fastener 120 pushes on the sleeve 130a, which in turn compresses the spring 140 via the flange 133a. The spring 140 compresses (see FIG. 2B) up until a point where the sleeves 130a, 130b make contact with one another (see FIG. 2C). Prior to the sleeves 130a, 130b making contact, the load path 104 goes through the spring 140, which allows the spring 140 to assist with the removal of the fastener 120 from the component 110 (e.g., from the threads 111). Once the sleeves 130a, 130b make contact, the load path 105 is established, which goes through the sleeves 130a, 130b (e.g., through the body portions 131a, 131b), The load paths 104, 105 are parallel to one another through the spring 140 and the sleeves 130a, 130b. The sleeves 130a, 130b can be configured to provide any suitable compressed spring length 135 (individual sleeve lengths may be the same or different), which may depend on a desired or available fastener travel during installation (e.g., provided by the threads), a characteristic of the spring 140 (e.g., spring rate), etc.

The sleeves 130a, 130b and the spring 140 are configured such that the sleeves 130a, 130b make contact before the spring 140 is fully compressed (i.e., before adjacent coils of the spring 140 are brought in contact with one another or before the spring 140 is caused to be "solid"), Because the sleeves 130a, 130b are much stiffer than the spring 140, the load path 105 transfers much more load than the load path 104, which effectively removes the spring 140 from structural preload consideration as the joint now becomes a rigid joint. Thus, at the fastener position shown in FIG. 2C (e.g., upon contact between the fastener 120, the sleeves 130a, 130b, and the component 110), the load path 105 is the effective load path for preloading the joint, and the fastener 120 can be torqued to a required preload through a solid joint interface without further compression of the spring 140. In other words, although the load paths 104, 105 exist in parallel in FIG. 2C, the load path 105 is the only one that matters at this point in terms of joint preload, which effectively bypasses the spring 140 from the preload load path (i.e., the load path 105 is an alternate load path to the load path 104 for joint preload consideration). The sleeves 130a, 130b can therefore be operable to form at least a portion of the load path 105 between the fastener 120 and the component 110 to preload the fastener 120 through the sleeves 130a, 130b. However, the presence of the load path 104 through the spring 140 becomes significant when separation or disassembly of the joint is required. In this case, loosening the fastener 120 rapidly reduces the load transferred through the load path 105 to zero, and the load path 104 through the spring 140 assists in the removal of the fastener 120 from the component 110. Thus, the spring 140 can be operable to form at least a portion of the load path 104 between the fastener 120 and the component 110 to facilitate biasing the fastener 120 away from the component 110. Stated differently, the load path 105 can be referred to as a primary load path, while the load path 104 can be referred to as a secondary load path, these being parallel to one another.

The principles disclosed herein can avoid the uncertainty and variability associated with using a spring in a structural application (e.g., in a joint preload load path) and can therefore ensure that consistent preload can be obtained and maintained while allowing a spring to be used to assist with joint separation (i.e., fastener removal). Thus, joints can be formed with hardware that is easily disassembled without compromising the structural integrity of the joint. One benefit is that the spring can be used with a fastener that is an unmodified, commercial off-the-shelf (COTS) fastener as opposed to a custom fastener, thus providing flexibility in the design and a low cost of implementation. In some embodiments, one or both of the sleeves 130a, 130b can be configured to structurally fail before structural failure of the fastener 120 and/or the component 110. In this case, one or both of the sleeves 130a, 130b can be considered "sacrificial" by being designed to preferentially fail in order to protect the fastener 120 and/or the component 110 from failure (e.g., in the event that the fastener 120 is over torqued).

Although the sleeves 130a, 130b are illustrated as being on the same side of the component 110 (i.e., wherein the sleeves 130a, 130b are configured to contact and interface with one another), it should be recognized that other configurations are possible, such as locating sleeves, each with an associated spring, on opposite sides of one or more components (e.g., a sleeve in contact with a bolt head on one side and another sleeve in contact with a nut on an opposite side).

Figure 3:
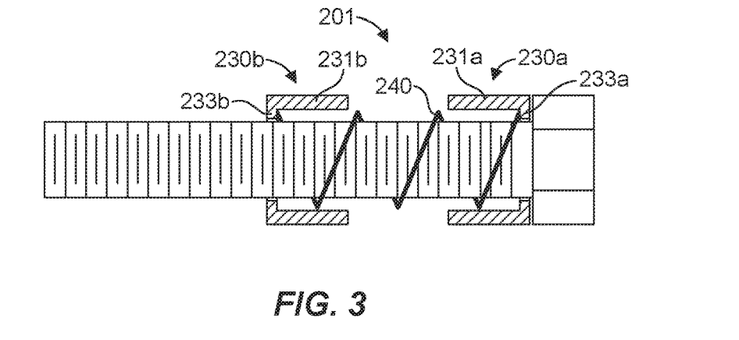
FIG. 3 is an illustration of a biasing system in accordance with an example of the present disclosure.

In addition, although the spring 140 is shown as being disposed on an outer or exterior side of the sleeves 130a, 130b, and the flanges 133a, 133b are shown as extending outwardly to contact the spring 140, it should be recognized that other configurations are possible. For example, as shown in FIG. 3, a biasing system 201 can include a spring 240 that is disposed on an inner or interior side of one or more sleeves 230a, 230b, such as relative to body portions 231a, 231b of the respective sleeves 230a, 230b. In addition, the sleeves 230a, 230b can include flanges 233a, 233b that extend inwardly at ends of the respective sleeves 230a, 230b to interface with the spring 240.

It should be recognized that sleeves and springs can be utilized in any suitable configuration or arrangement. For example, two or more springs can be arranged in parallel (e.g., side-by-side or on opposite sides of a sleeve) to form parts of parallel load paths. In certain embodiments, this spring configuration can be termed a "nested" spring configuration where a relatively small diameter spring is nested inside of a relatively large diameter spring. Similarly, two or more sleeves can be arranged in parallel (e.g., walls side-by-side or disposed on opposite sides of a spring) to form parts of parallel load paths. In certain embodiments, this sleeve configuration can be termed a nested sleeve configuration where a relatively small diameter sleeve is nested inside of a relatively large diameter sleeve.

Figure 4:
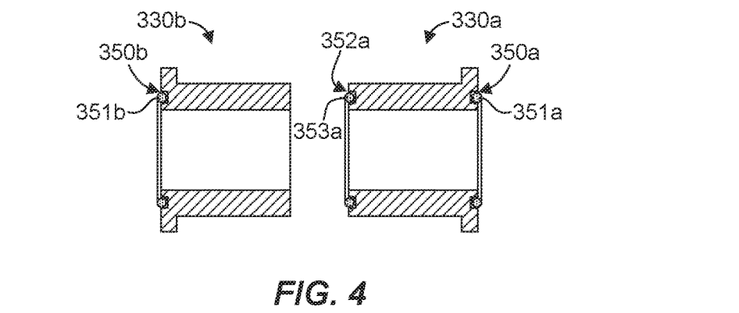
FIG. 4 is an illustration of a biasing system in accordance with an example of the present disclosure.
Figure 5:
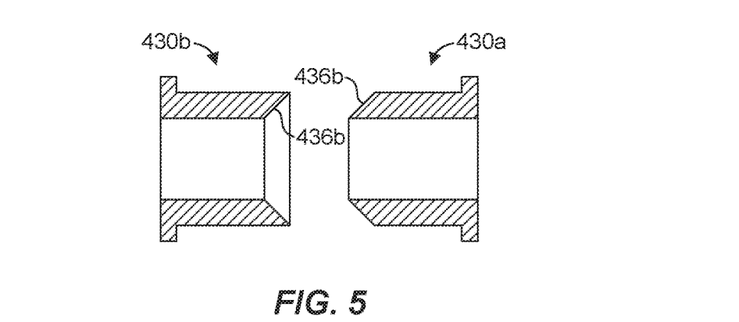
FIG. 5 is an illustration of a biasing system in accordance with an example of the present disclosure.
Figure 6:
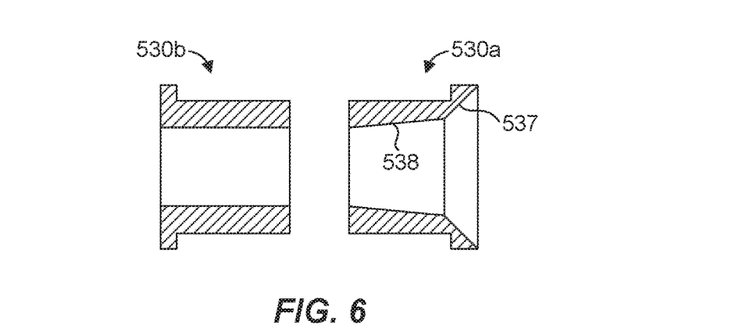
FIG. 6 is an illustration of a biasing system in accordance with an example of the present disclosure.

FIGS. 4-6 illustrate sleeve configurations in accordance with several examples of the present disclosure. FIG. 4 illustrates sleeves 330a, 330b that are configured to form a seal, which may be operable to maintain a fluid and/or pressure within a boundary formed by a joint. For example, the sleeve 330a can include a seal groove 350a (e.g., an O-ring groove) and associated seal 351a (e.g., an O-ring) at an end of the sleeve 330a (e.g., at a flange end of the sleeve 330a) configured to interface with a fastener or a component of a joint. Similarly, the sleeve 330b can include a seal groove 350b and associated seal 351b at an end of the sleeve 330b (e.g., at a flange end of the sleeve 330b) configured to interface with a fastener or a component of a joint. In addition, the sleeve 330a can include a seal groove 352a and associated seal 353a at an end of the sleeve 330a configured to interface with the sleeve 330b (e.g., opposite the flange end of the sleeve 330a).

FIG. 5 illustrates sleeves 430a, 430b that are configured with respective sleeve interface surfaces 436a, 436b that are interlocking. For example, the sleeve interface surfaces 436a, 436b can be tapered (e.g., conical), which can facilitate alignment of the sleeves 430a, 430b upon contact. The interlocking sleeve interface surfaces can have any suitable configuration, such as a stepped configuration, a castellated configuration, a splined configuration, and others as will be recognized by those skilled in the art.

FIG. 6 illustrates sleeves 530a, 530b where at least one sleeve 530a can be configured to fit or interface with a particular fastener configuration (e.g., a head and/or shank configuration). In the illustrated embodiment, the sleeve 530a has a fastener interface surface 537 configured to receive and interface with a tapered countersunk fastener head (e.g., a flathead screw) and an interior surface 538 configured to accommodate a tapered shank. It should be recognized that other configurations are possible, such as an interface configuration for a cylindrical countersunk fastener head.

Figure 7:
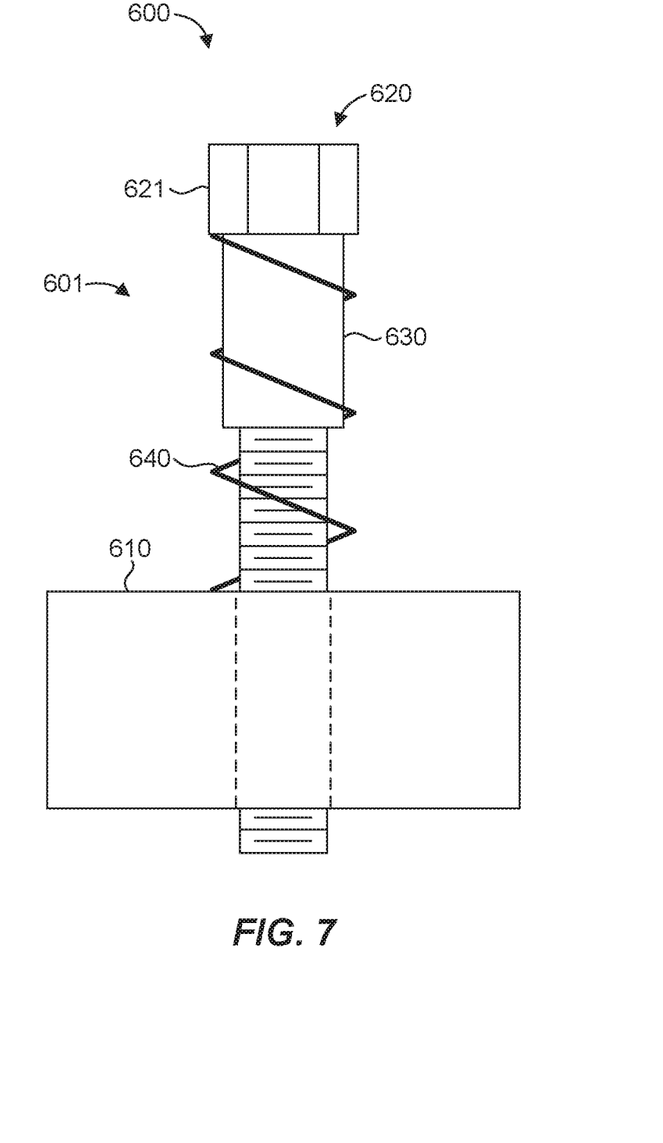
FIG. 7 is an illustration of a fastener system in accordance with another example of the present disclosure.

Biasing systems have been discussed above primarily in the context of two or more sleeves. FIG. 7 illustrates a fastener system 600 with a biasing system 601 that includes only a single sleeve 630. The sleeve 630 can be a separate component or it may be integrally formed with a fastener 620 or a component 610 as a single, monolithic structure. In addition, the sleeve 630 does not include a flange, although a flange on one end is optional. In this case, a spring 640 will contact and react directly against a head 621 of the fastener 620 and/or against the component 610, as opposed to flanged sleeves where a spring reacts against the flanges.

In accordance with one embodiment of the present invention, a method is disclosed for facilitating removal of a fastener from a component to which the fastener is coupled. The method can comprise providing a sleeve and a spring configured to be associated with the sleeve. The method can further comprise facilitating formation of at least a portion of a first load path through the sleeve between a fastener and a component coupled to the fastener to preload the fastener through the sleeve, Additionally, the method can comprise facilitating formation of at least a portion of a second load path through the spring parallel to the first load path between the fastener and the component to bias the fastener away from the component. It is noted that no specific order is required in this method, though generally in one embodiment, these method steps can be carried out sequentially.

In one aspect of the method, facilitating formation of at least a portion of the first load path through the sleeve comprises configuring the sleeve to be disposed about a shank of the fastener. In another aspect, facilitating formation of at least a portion of the second load path through the spring comprises configuring the spring and the sleeve such that the spring is positionable about an outer side or an inner side of the sleeve.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A biasing system for use with a fastener, comprising:
   first and second sleeves configured to be disposed end-to-end about a shank of a fastener and operable to form at least a portion of a first load path through an entire length of the first and second sleeves, and between the fastener and a component coupled to the fastener to preload the fastener through the first and second sleeves; and
   a spring configured to be associated with the first and second sleeves and operable to form at least a portion of a second load path parallel to the first load path between the fastener and the component to facilitate biasing the fastener away from the component,
   wherein at least one of the first sleeve or the second sleeve comprises a flange configured to interface with the spring.

2. The biasing system of claim 1, wherein an unloaded length of the spring is greater than a length of the first and second sleeves such that the second load path is formed at a first fastener position and the first load path is formed at a second fastener position.

3. The biasing system of claim 1, wherein the flange extends outwardly at an end of the at least one of the first sleeve and the second sleeve.

4. The biasing system of claim 1, wherein the flange extends inwardly at an end of the at least one of the first sleeve and the second sleeve.

5. The biasing system of claim 1, wherein ends of the first and second sleeves comprise interlocking interface surfaces.

6. The biasing system of claim 1, wherein the spring comprises a compression spring.

7. The biasing system of claim 1, wherein the spring comprises a helical configuration.

8. The biasing system of claim 1, further comprising a seal at an end of at least one of the first sleeve and the second sleeve.

9. The biasing system of claim 1, wherein a diameter of the first sleeve and a diameter of the second sleeve is less than or equal to an outer dimension of the fastener.

10. A fastener system, comprising:
    a component;
    a fastener coupled to the component; and
    a biasing system having
       first and second sleeves disposed end-to-end about a shank of the fastener and operable to form at least a portion of a first load path through an entire length of the first and second sleeves, and between the fastener and the component to preload the fastener through the first and second sleeves, and
       a spring associated with the first and second sleeves and operable to form at least a portion of a second load path parallel to the first load path between the fastener and the component to facilitate biasing the fastener away from the component,
       wherein at least one of the first sleeve or the second sleeve comprises a flange configured to interface with the spring.

11. The fastener system of claim 10, wherein the spring is disposed on an outer side of the first and second sleeves.

12. The fastener system of claim 10, wherein an outer diameter of the flange is less than or equal to a diameter of a head of the fastener.

13. The fastener system of claim 12, wherein the head comprises a cylindrical configuration.

14. The fastener system of claim 10, wherein the spring is disposed on an inner side of the first and second sleeves.

15. The fastener system of claim 10, wherein the fastener comprises a threaded fastener.

16. A method for facilitating removal of a fastener from a component to which the fastener is coupled, the method comprising:
    providing first and second sleeves and a spring configured to be associated with the first and second sleeves, wherein the first and second sleeves are configured to be disposed end-to-end, and wherein at least one of the first sleeve or the second sleeve comprises a flange configured to interface with the spring;
    facilitating formation of at least a portion of a first load path through the entire length of the first and second sleeves between a fastener and a component coupled to the fastener to preload the fastener through the first and second sleeves; and
    facilitating formation of at least a portion of a second load path through the spring parallel to the first load path between the fastener and the component to bias the fastener away from the component.

17. The method of claim 16, wherein facilitating formation of at least a portion of the first load path through the first and second sleeves comprises configuring the first and second sleeves to be disposed about a shank of the fastener.

18. The method of claim 16, wherein facilitating formation of at least a portion of the second load path through the spring comprises configuring the spring and the first and second sleeves such that the spring is positionable about an outer side or an inner side of the first and second sleeves.

19. A biasing system for use with a fastener, comprising:
    first and second sleeves configured to be disposed end-to-end about a shank of a fastener and operable to form at least a portion of a first load path between the fastener and a component coupled to the fastener to preload the fastener through the first and second sleeves; and
    a spring configured to be associated with the first and second sleeves and operable to form at least a portion of a second load path parallel to the first load path between the fastener and the component to facilitate biasing the fastener away from the component, wherein at least one of the first sleeve or the second sleeve comprises a flange configured to interface with the spring, and
    wherein an unloaded length of the spring is greater than a length of the first and second sleeves such that the second load path is formed at a first fastener position and the first load path is formed at a second fastener position.

20. A fastener system, comprising:
    a component;
    a fastener coupled to the component; and a biasing system comprising:
- first and second sleeves disposed end-to-end about a shank of the fastener and operable to form at least a portion of a first load path between the fastener and the component to preload the fastener through the first and second sleeves, and
- a spring associated with the first and second sleeves and operable to form at least a portion of a second load path parallel to the first load path between the fastener and the component to facilitate biasing the fastener away from the component, wherein at least one of the first sleeve or the second sleeve comprises a flange configured to interface with the spring, and
- wherein an unloaded length of the spring is greater than a length of the first and second sleeves such that the second load path is formed at a first fastener position and the first load path is formed at a second fastener position.

* * * * *